V. L. CAPWELL.
ROTARY ENGINE.
APPLICATION FILED NOV. 15, 1909.
972,598.
Patented Oct. 11, 1910.
3 SHEETS—SHEET 1.
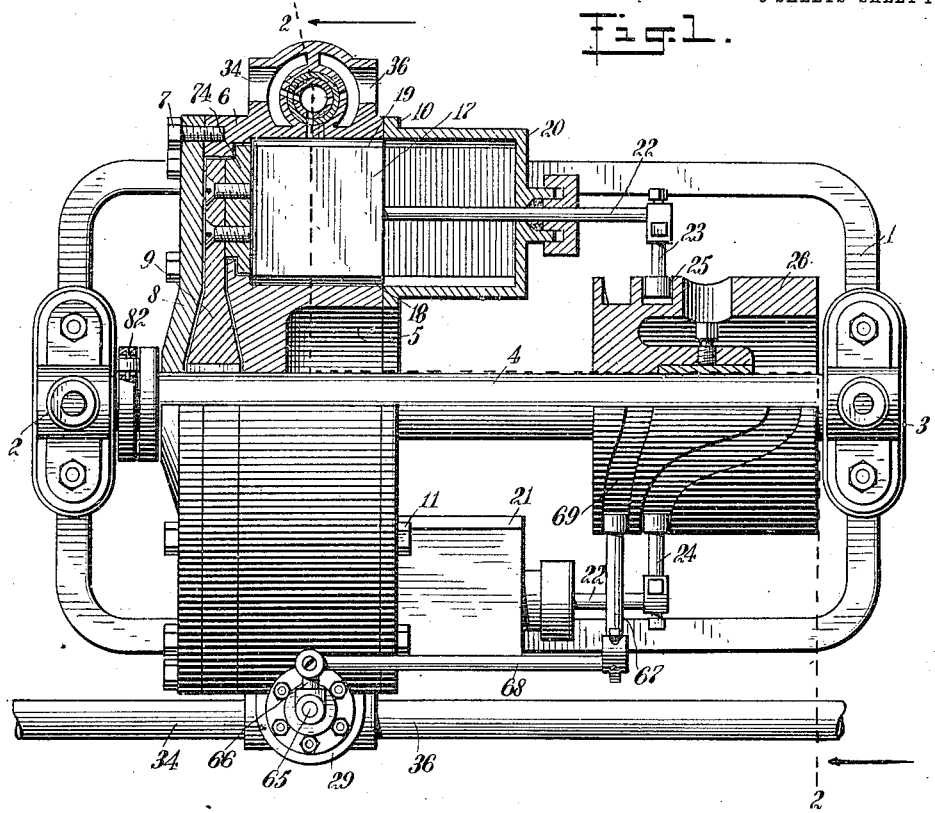
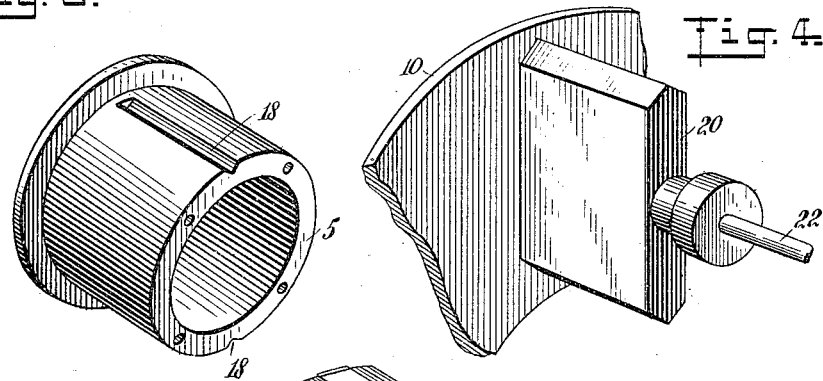
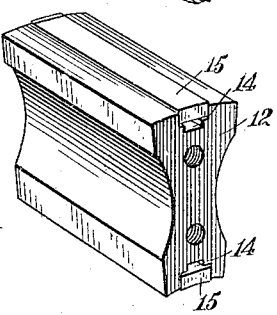
WITNESSES
INVENTOR
Vernon L. Capwell
BY
ATTORNEYS

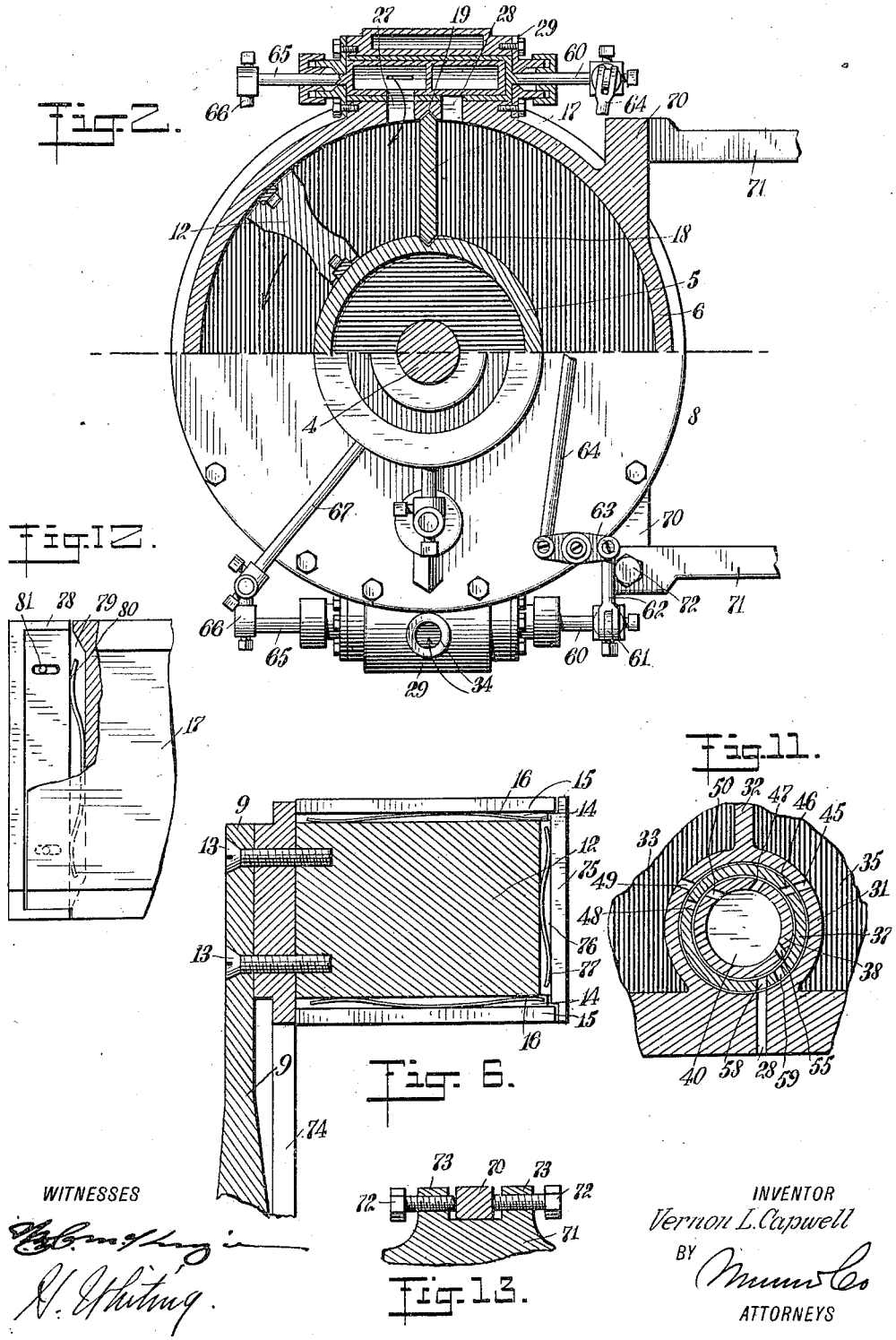

V. L. CAPWELL.
ROTARY ENGINE.
APPLICATION FILED NOV. 15, 1909.

972,598.

Patented Oct. 11, 1910.

3 SHEETS—SHEET 3.

WITNESSES

INVENTOR
Vernon L. Capwell
BY
ATTORNEYS

UNITED STATES PATENT OFFICE.

VERNON L. CAPWELL, OF DORRANCETON, PENNSYLVANIA, ASSIGNOR TO THE ROTARY ENGINE AND VALVE DEVELOPING COMPANY, OF DORRANCETON, PENNSYLVANIA.

ROTARY ENGINE.

972,598.   Specification of Letters Patent.   Patented Oct. 11, 1910.

Application filed November 15, 1909. Serial No. 528,211.

*To all whom it may concern:*

Be it known that I, VERNON L. CAPWELL, a citizen of the United States, and a resident of Dorranceton, in the county of Luzerne and State of Pennsylvania, have invented a new and Improved Rotary Engine, of which the following is a full, clear, and exact description.

This invention relates to an engine of a type in which the operating fluid is adapted to act directly on a vane or piston attached to the crank, and which is provided with a plurality of compound cylindrical valves for controlling the supply of operating fluid to the piston.

An object of this invention is to provide a device which will be simple in construction, noiseless and efficient in its operation, inexpensive to manufacture, strong and durable and easily re-fitted.

Another object of this invention is to provide a direct acting engine with a rotary piston, with means for supplying an operating fluid to said piston at a plurality of points during a single revolution thereof.

A further object of this invention is to provide a direct acting engine with a rotary piston, with means for supplying an operating fluid to said piston, at one side thereof, and with means for reversing the direction of the flow of fluid, so as to supply the same at the opposite side of said piston, whereby the direction of rotation of said piston may be reversed.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 7:
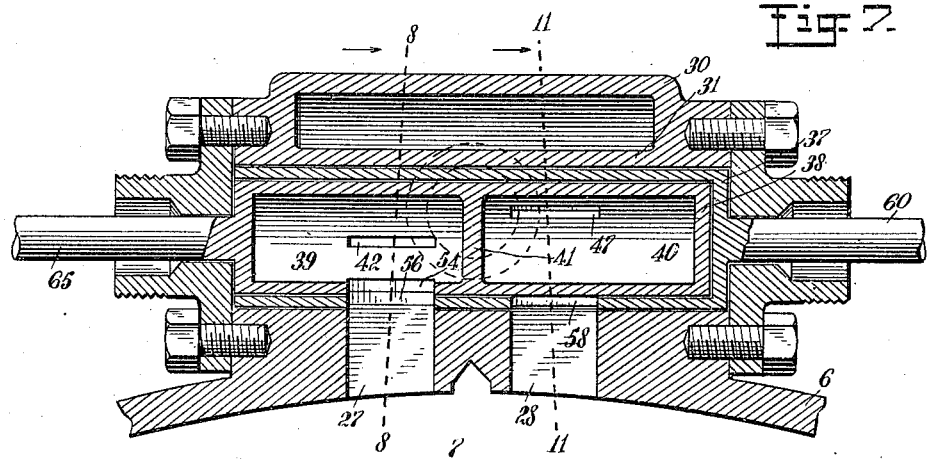
Figure 8:
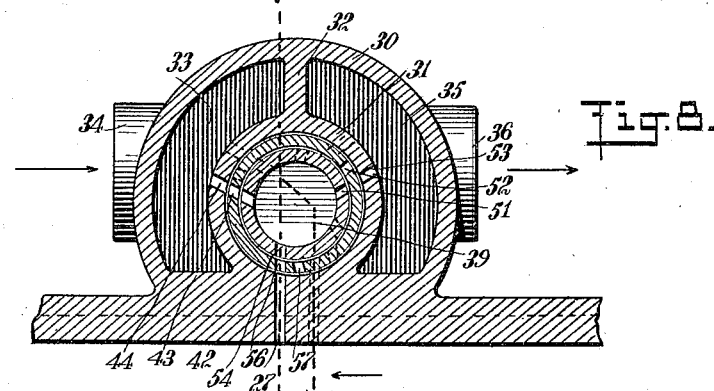
Figure 9:
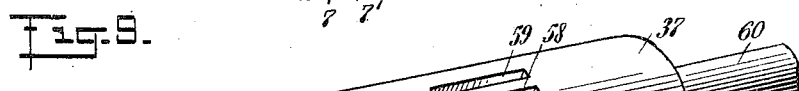
Figure 10:
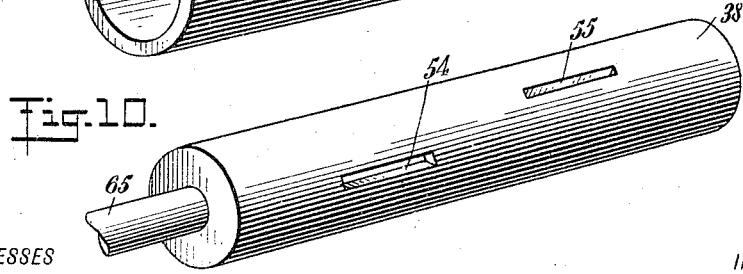

Figure 1 is a side view, in elevation, partly in section to show the underlying structure; Fig. 2 is an end view in elevation, partly in section on the line 2—2 in Fig. 1; Fig. 3 is a perspective view of the inner cylinder of the engine, bringing out the guide grooves therein; Fig. 4 is a fragmentary perspective view of one of the fulcrum or abutment valves; Fig. 5 is a perspective view of the piston; Fig. 6 is an enlarged vertical section through the piston and the crank to which it is connected; Fig. 7 is an enlarged vertical section, the left-hand part of the figure being taken on the line 7—7 of Fig. 8, and the right-hand part being taken on the line 7—7' of Fig. 8; Fig. 8 is a vertical section through the steam chest and valve casing, taken on the line 8—8 of Fig. 7; Fig. 9 is a perspective view of the outer or reversing valve cylinder; Fig. 10 is a perspective view of the inner or controlling valve cylinder; Fig. 11 is an enlarged vertical section on the line 11—11 of Fig. 7; Fig. 12 is a detail view of one of the abutment valves; and Fig. 13 is a detail section of the adjusting lugs.

Referring more particularly to the separate parts of the device, 1 indicates a base or foundation, which is provided with a plurality of journal bearings 2 and 3, in which is rotatably supported a shaft 4. The shaft 4 extends through central openings in an inner cylinder or casing 5 and an outer cylinder or casing 6. The cylinder 6 is provided with lugs 70, which are adjustably connected to extensions 71 of the bed by means of adjusting screws 72 on lugs 73. The cylinder 6 has secured thereto at one end, by any suitable means, such as bolts 7, a head 8, which is spaced apart from the cylinder 5, so as to form an annular groove, in which a crank 9, secured in any well known manner on the shaft 4, is adapted to rotate. The space between the cylinders 5 and 6 is covered at the opposite side from the head 8 by means of an annular head 10, which is secured to the cylinders 5 and 6 by means of bolts 11. The space formed between the cylinders 5 and 6 provides an annular channel which is closed tightly at one side by means of a follower ring 74, and in which is adapted to rotate a piston or vane 12 which is secured to the crank 9 and the ring 74 by means of screws 13. It is to be noted that the follower ring 74 is provided with annular recesses which are adapted to engage corresponding annular flanges on the cylinders 5 and 6 so as to form a perfectly tight fluid joint. In order to form a tight fit between the inner surfaces of the cylinders 5 and 6, there are provided in the top and bottom edges of the piston 12, longitudinal grooves 14, in which are adjustably secured packing strips 15, which are normally pressed outwardly by springs 16 interposed between the packing strips 15 and the rear sides of the grooves 14. The side of the piston which abuts against the follower ring 74 is also provided with a packing strip 75 which fits in a groove 76 and is yieldingly urged outward by means of a spring 77 to form a tight joint.

In order to form an abutment between whose surface and the surface of the piston the operating fluid may expand, there are provided a pair of fulcrum or abutment valves 17, located diametrically opposite each other, and sliding in grooves 18 and 19 formed in the cylinders 5 and 6. Recesses are provided in the head 10, forming valve casings 20 and 21, into which the abutment valves 17 are adapted to alternately recede, so as to remove them from the interior of the passageway formed between the cylinders 5 and 6. A fluid-tight joint is provided for in each abutment valve by having a packing strip 78 sliding in a groove 79 and normally pressed outward by a spring 80 but limited in its movement by a pin and slot connection. In order to reciprocate the valves, they are each provided with a valve rod 22, which have secured on their upper ends cam followers 23 and 24, which extend in a grooved guide 25 on a cylindrical cam 26, which is secured in any well known manner to the shaft 4. The grooved guide 25 on the cam 26 is so formed that it will alternately reciprocate the abutment valves 17, so as to normally have one of them between the cylinders 5 and 6, so as to act as an abutment for the fluid operating the piston 12. On each side of each abutment valve 17, there are provided port openings 27 and 28 in the cylinder 6, which are adapted to supply or exhaust the operating fluid to or from the interior of the cylinder 6, as the case may be.

A valve 29 is provided for the purpose of controlling the flow of fluid through each pair of port openings 27 and 28. These valves 29 are of the compound cylindrical type, so that either of the openings 27 or 28 may be made the inlet opening or the exhaust opening. Referring to Figs. 7 to 11 for the more particular structure of these valves, 30 indicates the outer casing of the steam chest, within which is provided a valve casing 31. The space between the casings 30 and 31 is divided by a partition 32, so as to form a pressure chamber 33, which is connected to a supply pipe 34, which is adapted to supply it with any suitable operating fluid, such as steam, compressed air or the like, and an exhaust chamber 35, which is connected to an exhaust pipe 36. Within the valve casing 31, there is provided a hollow cylindrical valve 37, which is for the purpose of reversing the engine, and may be termed the reversing valve. Concentric with the valve 37 and located within the same, there is provided a cylindrical valve 38, which is for the purpose of controlling the admission of the operating fluid to the cylinder, and the exhaust of the operating fluid from the cylinder. This valve may be termed the controlling valve. The controlling valve 38 is divided into two compartments 39 and 40 by means of a partition 41. Either of these compartments 39 or 40 may be connected with the pressure chamber 33 or the exhaust chamber 35. In order to connect the compartment 39 with the chamber 33, the valve 38 is provided with a port 42, which is adapted to be brought in alinement with a port 43 in the valve 37, which also is adapted to be adjusted into and out of alinement with a port 44 in the valve casing 31. When the port openings 43 and 44 are in alinement so that the compartment 39 may be connected by the valve 38 with the pressure chamber 33, port openings 45 and 46 in the valve casing 31 and the valve 37 respectively will be in alinement, so that they will form a connection, together with a port opening 47 in the valve 38, between the compartment 40 and the exhaust chamber 35. In order to reverse the engine and connect the compartment 40 with the pressure chamber 33, and the compartment 39 with the exhaust chamber 35, the valve 37 is provided with a port opening 48, which is adapted to be brought in alinement with a port opening 49 in the valve casing 31, when the port opening 43 is rotated out of alinement with the port opening 44. In order to complete the connection between the chamber 33 and the compartment 40, there is provided in the valve 38 a port opening 50 which is adapted to be brought into alinement with the alined openings 48 and 49. When the chamber 33 is connected to the compartment 40 by the openings 48, 49 and 50, the chamber 35 may be connected to the compartment 39 by a port opening 51 in the valve 38, which is adapted to be brought into alinement with port openings 52 and 53, formed respectively in the valve 37 and the valve casing 31. In order to form a communication between the compartment 39 and the interior of the cylinder 6 through the port 27, the valve 38 is provided with a port opening 54. In order to connect the compartment 40 with the interior of the cylinder 6 through the port 28, the valve 38 is provided with a port opening 55, which is adapted to be brought into alinement with the port 28. In order to form a direct connection between the ports 54 and 55 and the valve 38 respectively in each position of the valve 37, the latter is provided with two pair of port openings 56 and 57, and 58 and 59. The connection between the interior of the cylinder and the compartments 39 and 40 will thus be always open, as far as the reversing valve is concerned, in either position of the latter.

In order to manipulate the reversing valves 37, they are each provided with a valve spindle 60, each of which has secured thereon an arm 61 which is connected by a link 62 to a lever 63, pivoted in any well known manner to the head 8. The levers 63 are connected by an end link 64, which is adapted to be operated by a handle (not shown) so that the valves 37 may be simultaneously rotated to reverse the direction of the engine.

The operation of the controlling valves 38 is automatic. For this purpose, each of the valves 38 is provided with a spindle 65. Each of the spindles 65 is provided with an arm 66, and these arms are each connected to a cam follower 67 by means of a link 68. The cam followers 67 engage in a grooved guide 69 on the cam 26, which is of a form best adapted to give the necessary reciprocatory motion to the cam followers 67, so as to rotate the valve 38 the proper amount in a reciprocatory manner. The thrust on the shaft 4 is taken up by a roller bearing 82.

The operation of the device will be readily understood when taken in connection with the above description. Assuming the piston 12 to be rotated in a counter-clockwise direction, as indicated by the arrow in Fig. 3, the operating fluid will be admitted to the compartment 39 from the pressure chamber 33 through the openings 44, 43 and 42 in the upper valve 28. Under these conditions, the piston 12 will be in juxtaposition to the upper abutment valve 17, and the operating fluid will be admitted between the left-hand side of the abutment valve and the right-hand side of the piston 12 through the upper opening 27. The cylinder valves and the lower valve 29 will be in such a position as to permit the fluid back of or on the lower side of the piston 12 to exhaust therethrough. When the piston 12 passes the location of the lower abutment valve 17, the latter will be automatically slid between the cylinders 5 and 6 by means of the cam follower 24 acting in the guide groove 25. The valve cylinder 38 in the valve 29 will then be automatically rotated by the lower cam follower 67 acting in the guide groove 69, to connect the compartment 39 with the chamber 33 and with the interior of the cylinder 6 through the port 27. A second impulse to the piston will thus be imparted by the fresh operating fluid. Simultaneously with the supply of the operating fluid by lower valve 29 to the piston 12, the upper valve 29 will have its cylindrical valve 38 so revolved as to connect the compartment with the interior of the cylinder 6 and with the exhaust chamber 35. The operation is continuous, the piston 12 receiving two impulses during each rotation, the valves 28 and 29 automatically acting to best supply an operating fluid to the interior of the cylinder 6, and then to exhaust the expended operating fluid from the cylinder. In order to reverse the rotation of the piston 12, the link 64 is manipulated by the handle (not shown) so as to rotate the valve cylinders 37 in the valves 28 and 29, so as to connect the compartments 40 with the pressure chambers 33, and the compartments 39 with the exhaust chambers 35. The operating fluid will then be supplied to the interior of the cylinder 6 at the right-hand side of the upper abutment valve 17 through the port 28, and at the left-hand side of the lower abutment valve 17 through the port 28, so that the operating fluid will expand between the opposite sides of the abutment valves and the piston 12.

Having thus described my invention, I claim as new and desire to secure by Letters Patent:—

1. In a direct acting engine, the combination with a plurality of concentric cylinders, of a piston adapted to rotate between said cylinders, a plurality of abutment valves adapted to reciprocate between said cylinders, means for controlling the supply of an operating fluid to either side of said abutment valves, comprising a steam chest casing, a valve casing having port openings therein, and a plurality of concentric cylindrical valves having port openings therein adapted to connect said openings in said casing with the interior of one of said cylinders.

2. In a direct acting engine, the combination with a shaft, of a pair of cylinders concentrically arranged in spaced relation and having bearings for said shaft, a piston adapted to rotate between said cylinders and secured to said shaft, a plurality of reciprocating abutment valves adapted to slide between said cylinders and adapted to be guided by said cylinders, a cam on said shaft having a guide groove therein adapted to alternately reciprocate said valves, a valve for controlling the flow of fluid to and from the passages between said cylinders, a reversing valve, an automatic control for said controlling valve, and a manual control for said reversing valve.

3. In a direct acting engine, the combination with a plurality of concentrically arranged spaced cylinders of a shaft journaled in said cylinder, a piston secured to said shaft and adapted to rotate between said cylinders, a plurality of abutment valves guided by said cylinders and adapted to reciprocate between said cylinders, means for controlling the flow of fluid to the passageway formed between said cylinders, said means comprising a steam chest casing divided into an exhaust chamber and a pressure chamber, a valve casing having openings communicating with said chambers, a controlling valve in said valve casing, having two compartments therein, a reversing valve in said valve casing, having openings therein adapted to connect either of said compartments in said controlling valve with either said pressure chamber or said exhaust chamber, one of said cylinders having openings therein whereby both of said compartments are adapted to be connected to the interior of said last mentioned cylinder, a manual control for said reversing valve, an automatic control for said controlling valve, and an automatic control for said abutment valves, said automatic controls being operated by a cam on said shaft.

4. In a direct acting engine, the combination with a shaft, of a crank connected to said shaft, a pair of cylinders arranged in spaced relation, a following ring secured to said crank and adapted to rotate between said cylinders, said following ring having annular recesses therein which are adapted to engage corresponding flanges in said cylinders, and a piston secured to said crank.

In testimony whereof I have signed my name to this specification in the presence of two subscribing witnesses.

VERNON L. CAPWELL.

Witnesses:
WALTER H. KYTE,
HARRY E. BONHAM.